No. 816,003. PATENTED MAR. 27, 1906.
J. E. CHAMBERS.
INCUBATOR.
APPLICATION FILED NOV. 6, 1905.

2 SHEETS—SHEET 1.

Witnesses:
G. R. Thomas
M. T. Dixon

Inventor:
John E. Chambers
Henry H. Bates
By
Attorney

No. 816,003. PATENTED MAR. 27, 1906.
J. E. CHAMBERS.
INCUBATOR.
APPLICATION FILED NOV. 6, 1905.

2 SHEETS—SHEET 2.

Witnesses
G. R. Thomas
M. T. Dixon

Inventor
John E. Chambers
By Henry H. Bates
Attorney

UNITED STATES PATENT OFFICE.

JOHN E. CHAMBERS, OF SHELBYVILLE, INDIANA.

INCUBATOR.

No. 816,003.     Specification of Letters Patent.     Patented March 27, 1906.

Application filed November 6, 1905. Serial No. 286,055.

*To all whom it may concern:*

Be it known that I, JOHN E. CHAMBERS, a citizen of the United States, residing at Shelbyville, in the county of Shelby and State of Indiana, have invented new and useful Improvements in Incubators, of which the following is a specification.

My invention relates to improvements in incubators for the artificial hatching of eggs, whereby it is designed not only to insure the hatching of the entire brood, but also the production of healthy chicks, which can be successfully reared to maturity.

It is universally admitted that nature's method of incubation is the best, barring accidents and irregularities, which can be guarded against in artificial hatching.

My object is to reproduce natural conditions so far as possible: A correct and uniform temperature is not enough. A hen will raise a healthy brood under widely-varying conditions of temperature, while an incubator with absolutely uniform temperature may fail to produce healthy chicks or to hatch out a brood at all. The proper aeration of the eggs with natural air is an element of success and also the warming of the eggs by positive contact with a warm surface which does not exclude proper ventilation. It is a mistake to warm or ventilate the eggs with air which has first been heated to such a degree as to bake out the natural moisture and vivifying qualities. The egg, even though unhatched, is a vital being and can be stifled in embryo. My device therefore warms the eggs by actual contact with a warm surface in imitation of nature's method and prevents the penetration of the confined and baked air to the eggs, while furnishing an independent source of natural air among the eggs for purposes of aeration and ventilation.

It is furthermore my object to furnish a refuge for the newly-hatched chicks not too far removed from the temperature and place of incubation or from the conditions which nature furnishes with a warm soft yielding surface at the back of the chick, who naturally seeks for it as a mother, from which to derive warmth and vitality.

Figure 1:
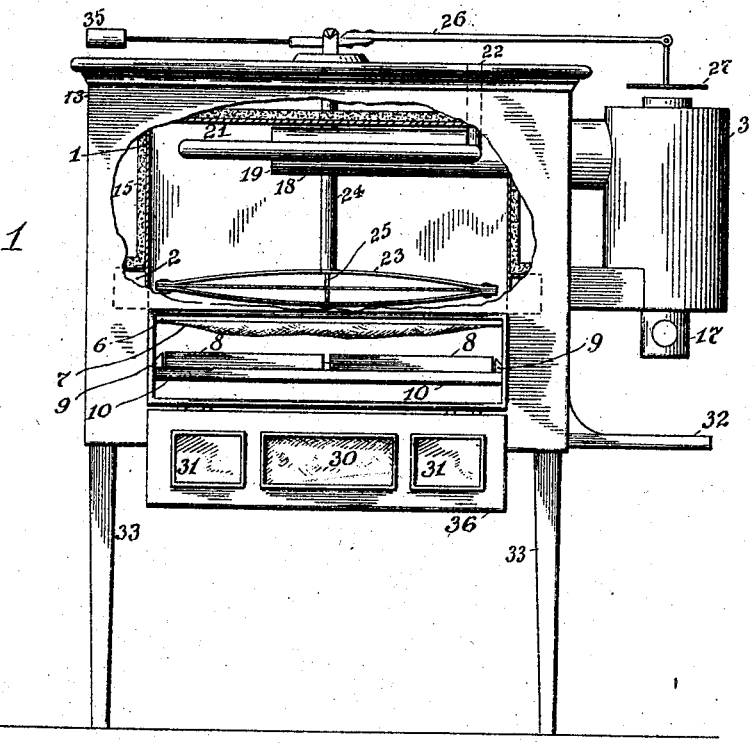
Figure 2:
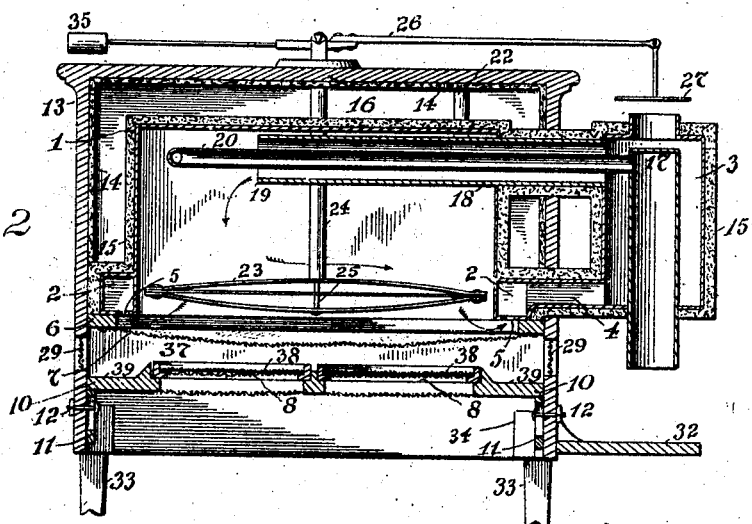
Figure 3:
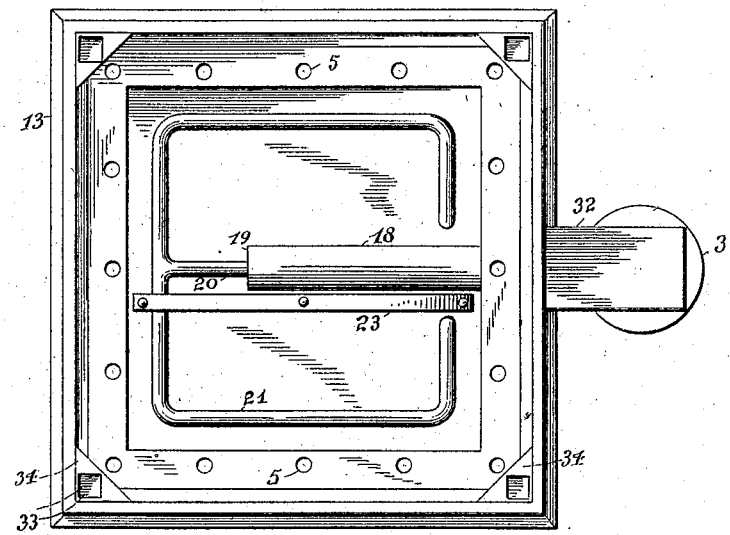
Figure 4:
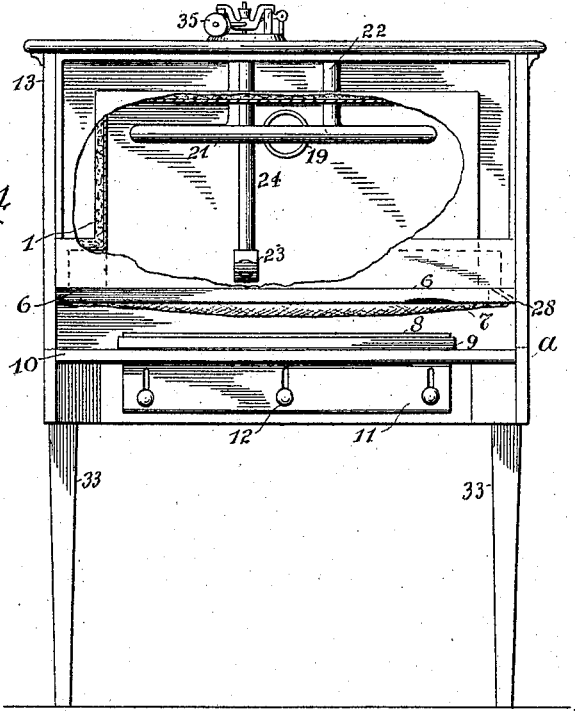

In the drawings forming a part of this specification, Figure 1 is a front elevation of the incubator, front and rear being alike, with the open door swung down on its horizontally-placed hinges and with an opening torn in the wall above the door to show the internal arrangement. Fig. 2 is a central vertical lateral section showing the details of the main features. Fig. 3 is a bottom or inverted plan view, the floor and diaphragm being removed to show the upper chamber. Fig. 4 is an end elevation looking from the left of Fig. 1 with a portion of the upper wall torn away and the lower portion of the wall removed.

The device consists, primarily, of a box 1 without bottom, preferably made of sheet metal to insure absolute safety against fire and low insurance rates and covered throughout with a coating of refractory non-heat-conducting substance, such as asbestos or mineral wool. It is surrounded at its lower edge with an air-duct 2 of same material and covering entirely closed except for air-holes 5 5 in its bottom and for the passage 4, which leads into a heating-chamber 3, surrounding the heater 17, jacketed, like the box 1, with refractory non-conductive material. The outer edge of air-duct 2 rests upon a narrow rectangular frame 6, as shown in Figs. 2 and 4, the lower edge also appearing in Fig. 1 through the open door. This frame 6 carries upon its lower surface a flexible loose member constituting the diaphragm 7, preferably made of woven fabric slightly pervious or porous to air, more or less, according to conditions. When the material is impervious, or nearly so, it is supplemented for ventilative purposes by holes or perforations bored in frame 6, as seen at 28, Fig. 4, to admit fresh outer air above the diaphragm. Said diaphragm forms, essentially, the bottom of box 1, which is otherwise a closed chamber except for the damper-outlet. Within said box 1, centrally located near the diaphragm, is some form of thermostat for automatically maintaining a uniform and regulated temperature in the box, which may be any of the numerous varieties in common use. The one I have shown for purposes of illustration is of the metal-bar variety, consisting of bars 23, of metals of dissimilar heat-expansive qualities, fastened together at the ends and variable in the middle by expansion and contraction of the bars under variations of temperature, suspended in the box by tube 24 and connected by rod 25 with the lever-arm 26, which carries at one extremity the damper 27 and is counterbalanced at the other end 35. Said damper 27 by its sensitive risings and falls, due to slight variations of temperature in the box, regulates the heat in heating-chamber 3, heated, preferably, by a lamp placed below heater 17 on bracket 32, which heats the said heater, and thus affords heat to the jacketed chamber 3, communicating with the interior of the box by pipe 18, preferably of thin sheet metal, which is carried across beyond the middle of the box to secure the most even distribution of heat within the same, the part nearest the heater being the warmest. A practically-closed circulation is thus secured, except for the damper-outlet, the hot air rising in the jacketed chamber 3 passing mostly through tube 18, out at mouth 19, thence downward along the surface of diaphragm 7, out through holes 5 in duct 2, and thence through passage 4 into chamber 3 again. Additional air to supply that which may disappear through the damper-outlet enters through the porosities of the diaphragm or through perforations 28 in frame 6, or both. The products of combustion from the lamp which heats the heater 17 pass through pipe 20 and its branches 21, which contribute to the uniform heating of the box interior and economize heat, and thence pass upward and outward through the vertical branches 22. The darts indicate the course of circulation of air in the box 1. The warm air passes over diaphragm 7, as before-said, out at its edges through holes 5, warming its whole surface evenly to correspond to the temperature of the breast of the hen, and passing up into duct 2, passage 4, and heating-chamber 3 to be used over and over again. The heat is thus economized, as there is no object in using constantly fresh air for this purpose, since the proper ventilation of the eggs is otherwise accomplished. The relatively small volume of air which escapes at the damper is ordinarily supplied by percolation through the diaphragm 7, and this causes a slight upward draft through said diaphragm, which facilitates aeration of the eggs by drawing in fresh supplies of natural air in chamber 37. The adjustment of the damper-lever must be such as to leave the damper always slightly open at the temperature required for incubation in order to insure the proper regulation.

By the means above described the eggs are warmed to the correct temperature by contact with an evenly-heated surface, imitating nature, which surface is in the proper position on top of the egg, where the germ lies, while the egg is at the same time shielded from contact with air which has been dried or baked by a previous high temperature, the proper ventilation and aeration of the eggs being provided for by other means.

Beyond the non-conductive covering of the box 1 is the outer case 13, preferably of wood, to form an ornamental finish, but lined throughout with a non-conductive lining, preferably a layer of cotton overlaid with strawboard; but any equivalent non-conductive lining will answer. A dead-air space 16 is thus provided between the asbestos covering of the inner box and the lining of the outer box, which, in conjunction with those two, constitutes a complete protection against heat radiation from the box 1.

Below the warm-air circulation-chamber, of which diaphragm 7 forms the bottom, is a second chamber 37, practically open below, but closed at the sides and also at front and rear by horizontally-hinged falling doors 36, which close upward. In this chamber just below the diaphragm 7 are the egg-supports 8, which are preferably removable trays carried upon a floor 10 in guides 9, which permit them to slide in and out. They have foraminous bottoms pervious to air from beneath, preferably of wire-cloth. The floor 10 is cut out beneath the trays and fitted at the openings also with wire-cloth or equivalent pervious or foraminous screens. In practice a porous-cloth lining 38 is placed on the foraminous trays beneath the eggs, which transmits sufficient pure air at all times to properly aerate the eggs. It may be very thin in summer and proportionally thicker or of more layers in colder weather. The warmth of the eggs and the heated diaphragm above them sufficiently modifies this air without deteriorating it, and the surplus which does not penetrate the diaphragm constantly escapes through porous or foraminous panels 29 29 in the ends of the case and similar foraminous panels 30 in door 36. Said door has also glass panels 31 for inspection and observation. The floor 10 is considerably larger in extent than the area occupied by the trays, a margin 39 being left all around the trays, as indicated in Fig. 2. This might seem extravagant of space; but its purpose is to provide room for the chicks to run out on as they hatch, thus doing away with the necessity for a separate nursery, which is apt to be deficient in the proper temperature and improperly ventilated. Said margin is a refuge near at hand, close to the warm diaphragm, and requiring no transfer of chicks to a new locality. In order to bring eggs of widely-varying sizes to suitable contact with the diaphragm 7, floor 10 is made adjustable as to height. As illustrated, it is supported on movable strips 11, one at each end, which by means of the vertical slots in the strips and bolts 12 in the casing or any other suitable means of adjustment, can be shifted as to height to meet the conditions.

32 is a bracket-shelf for the lamp which supplies the warmth to the heater 17.

33 33 are the legs of the device, preferably removable from their sockets for transportation.

34 34 are corner-braces for the frame or casing 13.

The box or upper chamber of the device if disjointed at about the level of the floor 10 (as at a, Fig. 4) makes a capital brooder for the newly-hatched brood, placed upon a warm floor, and adjusted just high enough for the chicks to run under. They can stand up and press their backs against the warm diaphragm until they are warm enough, and when they want to sit down and sleep the diaphragm settles gently down upon them and keeps them warm, hen style. The essentials of the said diaphragm are that it shall afford a warm soft yielding surface to the back of the chick, imitating the breast of the hen as closely as possible, so that in some cases a soft padded surface will answer instead of the flexible fabric above described, though the latter is the one that I have found efficient in practical experience.

I claim and desire to secure by Letters Patent—

1. In an incubator, a support for eggs, a yielding foraminous fabric above said support at a suitable distance to contact with the eggs borne thereon, means above said fabric for heating it, and means for maintaining it at a uniform regulated temperature, whereby the eggs may be incubated by positive contact with a superposed warm flexible surface, substantially as specified.

2. In an incubator, a foraminous support for eggs, a yielding diaphragm above said support, adapted to come in contact with the eggs borne thereon, an air-chamber above said diaphragm, of which the latter forms the bottom, means for heating the air in said chamber, and means for maintaining said air at a uniform regulated temperature; substantially as specified.

3. In an incubator, an upper air-chamber, a yielding diaphragm forming the bottom of said chamber, means for heating the air in said chamber, means for maintaining said air at a uniform regulated temperature, a lower chamber beneath said diaphragm, a floor in said lower chamber carrying removable egg-trays, at a height suitable to hold the eggs in contact with said diaphragm, and means to admit fresh air among the eggs on said trays, said air being separated from the air in the upper chamber by said diaphragm, substantially as specified.

4. In an incubator, an upper air-chamber, a yielding diaphragm forming the bottom of said chamber, means for heating the air in said chamber, means for maintaining said air at a uniform regulated temperature, a lower chamber beneath said diaphragm, and a floor in said lower chamber carrying removable foraminous egg-trays, said floor being foraminous, and provided with means for adjusting the height thereof relatively to said diaphragm, substantially as specified.

5. In an incubator, an upper air-chamber, a yielding diaphragm forming the bottom of said chamber, means for heating the air in said chamber, means for maintaining said air at a uniform regulated temperature, a lower chamber beneath said diaphragm, and a floor in said lower chamber, carrying removable foraminous trays in its central area, leaving a marginal space adjacent to said trays, as a runway for newly-hatched chicks, substantially as specified.

6. In an incubator, an upper air-chamber, closed on its top and sides with refractory non-heat-conductive covering, an outer casing for said chamber, with an intervening dead-air space, an air-duct all around the bottom of said chamber, with perforations therein, a diaphragm of yielding material, forming the bottom of said chamber and below the air-duct, means for maintaining the air above the diaphragm at a uniform regulated temperature, means beneath said diaphragm for sustaining eggs in contact with the warmed surface thereof, and means for admitting air at atmospheric temperature among said eggs, separated from the heated air of the upper chamber by said diaphragm, substantially as specified.

7. In an incubator, an air-chamber, a yielding diaphragm forming the bottom of said chamber, means for maintaining the air in said chamber at a uniform regulated temperature, an air-duct all around the bottom of said chamber, above said diaphragm, perforations in said air-duct, said air-duct communicating with the upper part of the chamber, and means for heating the air beyond the air-duct, whereby a circulation of warmed air is set up and maintained through said chamber and air-duct, passing over the diaphragm, substantially as specified.

8. In an incubator, an upper chamber, a lower chamber, a yielding diaphragm between said chambers, forming the floor of said upper chamber, a means for warming said diaphragm, above the same, a means for maintaining said diaphragm at a uniform and regulated temperature, an egg-support in said lower chamber, and means for admitting unwarmed air beneath said diaphragm, substantially as specified.

In testimony whereof I have signed my name to this specification in the presence of two subscribing witnesses.

JOHN E. CHAMBERS.

Witnesses:
CHARLES A. HACK,
GEO. H. MEIKS.